Figure 1:
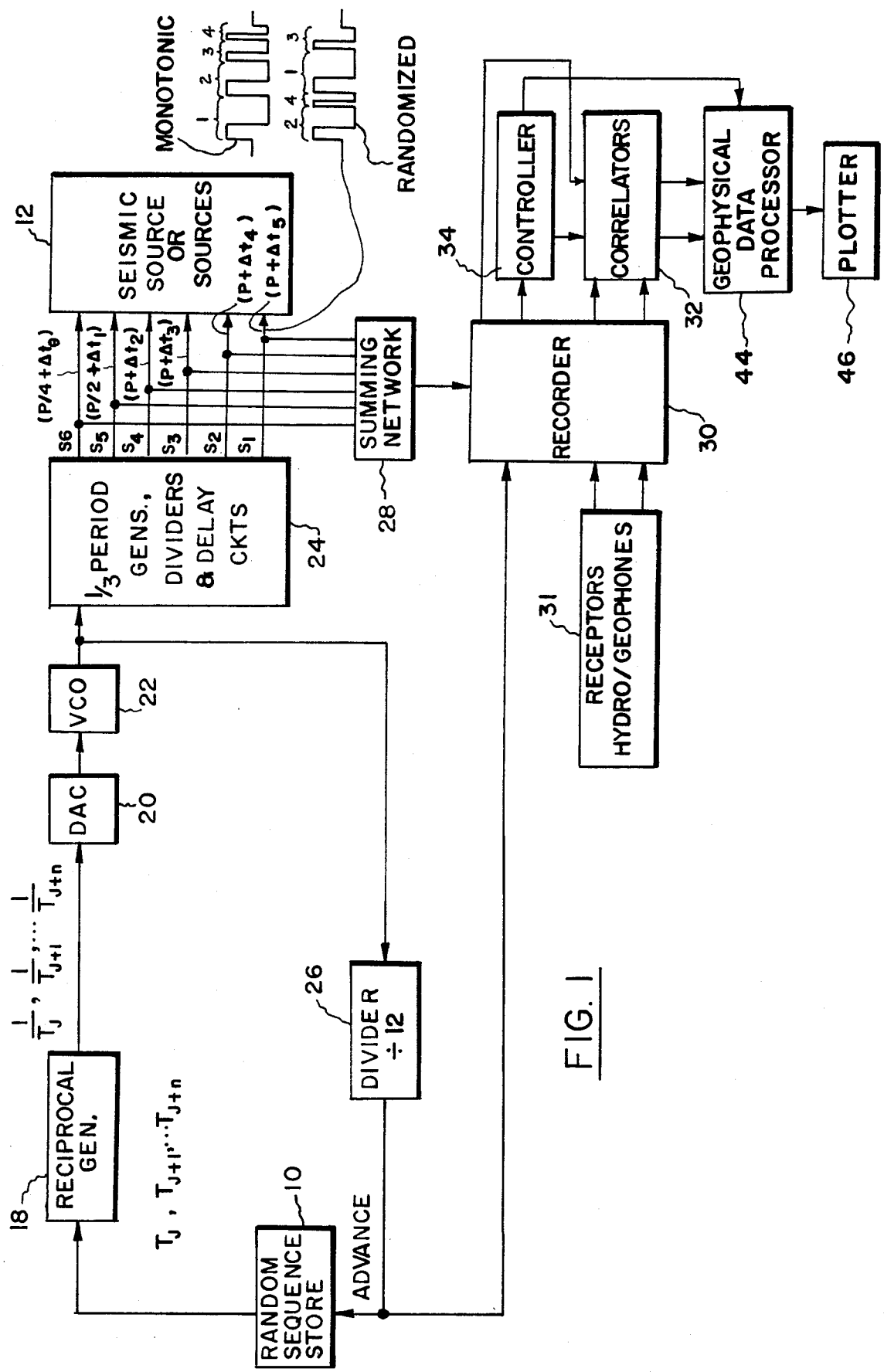

United States Patent [19]

Savit

[11] Patent Number: 4,545,039
[45] Date of Patent: Oct. 1, 1985

[54] METHODS FOR SEISMIC EXPLORATION

[75] Inventor: Carl H. Savit, Houston, Tex.

[73] Assignee: Western Geophysical Co. of America, Houston, Tex.

[21] Appl. No.: 416,531

[22] Filed: Sep. 9, 1982

[51] Int. Cl.$^4$ .............................................. G01V 1/00
[52] U.S. Cl. .......................................... 367/39; 367/38
[58] Field of Search ....................... 367/39, 40, 189, 38, 367/41, 42; 364/179, 421

[56] References Cited

U.S. PATENT DOCUMENTS

| | | | |
|---|---|---|---|
| 3,264,606 | 8/1966 | Crook et al. | 367/39 X |
| 3,326,320 | 6/1967 | Forrester | 367/41 X |
| 3,697,938 | 10/1972 | Taner | 367/39 |
| 3,811,111 | 5/1974 | Barbier et al. | 367/40 X |
| 3,863,057 | 1/1975 | Siems | 367/41 |
| 3,863,058 | 1/1975 | Savit | 367/41 |
| 3,956,730 | 5/1976 | Barbier | 367/37 X |
| 3,968,471 | 7/1976 | Savit | 367/39 |
| 4,011,924 | 3/1977 | Barbier | 367/39 X |
| 4,037,190 | 7/1977 | Martin | 367/40 |
| 4,042,910 | 8/1977 | Reitsh | 367/40 |
| 4,204,278 | 5/1980 | Nelson | 367/39 X |
| 4,346,461 | 8/1982 | Muir | 367/39 |

OTHER PUBLICATIONS

Goupillaud, Signal Design in the "Vibroseis" Technique, Geophysics, vol. 41, No. 6, pp. 1291-1304, Dec. 1976.

Cunningham, Some Alternate Vibrator Signals, Geophysics, vol. 44, No. 12, pp. 1901-1921, Dec. 1979.

Primary Examiner—Nelson Moskowitz
Assistant Examiner—Brian S. Steinberger
Attorney, Agent, or Firm—Norman E. Brunell

[57] ABSTRACT

Sweeps of seismic signals consisting of pulse trains having a predetermined number of pulses in which the periods or durations of the pulses are randomized and in which the wave shape and relative time displacements of the pulses in different trains provides substantially constant spectral level over a frequency range containing several octaves even though the durations of the pulses correspond to a frequency range not exceeding an octave during the sweep are transmitted through the medium being explored such as an earth formation to receptors such as geophones or hydrophones. Groups of signals contained in less than the entire length of the sweep which are transmitted and which are received can be cross correlated to vary the effective duration of the sweep. The cross correlation output of successively occurring sweeps may be stacked to reduce the side lobe amplitude of the cross correlation outputs from each sweep, from which outputs seismograms may be constructed.

2 Claims, 2 Drawing Figures mum the cross correlations of the selected sequences with each other.

To those skilled in those branches of mathematics that deal with sets, it will be apparent that a considerable variety of different sets of orthogonal sequences may be generated from the sets generated as described hereinabove by different one-to-one mappings of the set of integers from one to n onto itself.

The output of the store for any sweep j is a sequence of numbers n shown as $T_j, T_{j+1} \ldots T_{j+n}$. These numbers are digital numbers which may be eight bits in length where n is 196. The numbers are applied successively to a reciprocal generator 18 which generates a reciprocal of these numbers $1/T_j, 1/T_{j+1} \ldots 1/T_{j+n}$. A digital to analog convertor (DAC) 20 converts the value represented by each of these numbers into a control voltage which is applied to a voltage controlled oscillator (VCO) 22. The VCO 22 outputs a pulse train which at its lowest repetition frequency is the repetition frequency of the low end of the sweep multiplied by a factor depending upon how many periods of the pulse train from the VCO 22 are needed to generate the signals S1 to S6 in the ⅓ period generators, dividers and delay circuits 24. In this example, this factor is twelve. The repetition frequency of the pulse train produced by the VCO 22 at the highest repetition frequency of the sweep is also multiplied by the same factor. The repetition frequency varies over an octave frequency range, for example, from five to ten Hertz or from ten to twenty Hertz in a typical application of the illustrated apparatus. Each time twelve pulse periods are generated, a divider 26 outputs a command to advance the store 10 to produce the next signal period.

The VCO 22 operates in a manner similar to the VCO 101 in the circuit described in connection with FIG. 5 of the Nelson U.S. Pat. No. 4,204,278. The generators 10 and 16, the number ordering logic 14, the reciprocal generator 18, the DAC 20 and the divider 26 serve a function in the nature of the function provided by the ramp generator 102 in Nelson FIG. 5; however, instead of a monotonic sweep the signals in the sweep have different durations and are randomized. The ⅓ period generators, dividers and delay circuits may suitably be those described in connection with FIG. 5 of the referenced Nelson patent. Therefore, the signals S1 to S4 which have been divided down in the dividers of the circuits 24 are each the longest duration and define the fundamental period which is the duration of each of the signals of the 196 signals which make up a sweep. The periods of these pulses in each duration are the same and are indicated as P. The signal S5 is half the duration of the signals S1, S2, S3 or S4 or P/2. The signal S6 is half the duration of the signal S5 or P/4. All of the signals are relatively delayed with respect to each other as indicated by the terms $\Delta t_1$ through $\Delta t_5$. In other words the signals S1 to S4 are at the fundamental repetition frequency while the signals S5 and S6 are twice and four times the fundamental repetition frequency, respectively. The one third period generators produce these signals with a wave form with two levels which divide the period into proportions of one to two. For example, the relatively positive level has a duration in proportion to the relatively negative level in a ratio of one to two. The relatively positive level is of a duration in proportion to the total period of the signal in a ratio of one to three. Accordingly, the term one third generator aptly describes the generation of the signals. For the signal of fundamental S1, there are shown in FIG. 1 two wave forms in which signals corresponding for example to numbers 1, 2, 3 and 4 are displayed in a monotonic sweep. These signals occur successively and the periods of the signals decrease (their repetition frequency increases) as the sweep procedes. In the randomized sweep provided in accordance with the example the numbers corresponding to the signals and the signals as can be seen by their fundamental periods appear in random order as the sweep proceeds. Further information as to the design of the one third period generators, dividers and delay circuits 24 may be obtained by reference to the Nelson U.S. Pat. No. 4,204,278.

The replica of the transmitted signal is obtained by means of a summing network 28. The replica, the advance signal which indicates the occurrence of the signals in each sweep and outputs from the receptors 31 (the hydrophones and geophones in this spread or streamer) are all recorded in separate channels on a multi-channel recorder 30. Each of these signals from each of the receptors 31 is correlated with the replica in correlators 32. The correlations may be carried out over a set of consecutive sweeps or over individual sweeps.

If, for example, it is required to map relatively shallow geologic strata in fine detail, the individual sweeps may be of short duration and correlation is performed with individual sweeps. If, on the other hand, enhancement of weak reflections from great depths is required from the same survey, correlation may be performed with groups of successive short sweeps in the same manner as if each group constituted a single long sweep. The groups of sweeps may be disjunct or may be overlapped, for example, by using four successive sweeps as the correlation template but stepping ahead only two sweeps each time a correlation is performed.

By way of illustration, if the sequence of successive sweeps is designated A B C D E F G H I J K—correlation may be performed using the successive sequences: ABCD, EFGH, etc. or alternatively ABCD, CDEF, EFGH, etc. Such correlation options will be valid particularly because the sweeps are mutually orthogonal. Random, but not necessarily orthogonal, sweeps may also be used but correlation side lobes will, in general, be somewhat higher.

In the art of geophysical exploration by the seismic reflection method it is customary to combine or "stack" may output traces, such as the outputs of correlators, 32 in such a way as to enhance reflection signals and suppress background noise. Correlation side lobes are a significant source of such undesired noise.

FIG. 2(a) shows the autocorrelogram of a monotonic sweep as disclosed in the Nelson patent. It is apparent that the early side lobes in this correlogram are substantially stronger than are the later ones. In the case of the autocorrelogram of the randomized sweep in (b), it is seen that the level of both early and late side lobes is the same but that level is larger than the level of the later side lobes in (a).

When, however, several autocorrelograms are stacked as shown in (c), both early and late side lobes are reduced to the level of the late side lobes in the autocorrelogram of the monotonic sweep. Stacking of monotonic sweep autocorrelograms will not similarly reduce side lobes because, in the monotonic case, the side lobes from successive sweeps are the same and do not average out as is the case with randomized sweeps.

The benefit of stacking in current geophysical practice will be substantially greater than indicated by the example because a considerably greater number of traces are stacked.

The steps of carrying out the necessary correlations and stacking are well known in the geophysical art and will not be described in detail. Those steps are usually carried out in well known devices such as controller 34, correlators 32 and geophysical data procesor 44. The final output after full geophysical processing is put into graphical form by a plotter 46.

Sound sources employing randomized orthogonal sweeps are particularly useful in marine surveys under each of a variety of conditions in which impulsive sound sources and sources employing monotonic sweeps are precluded from operating or are severely handicapped.

There are in various parts of the world offshore areas in which a number of seismic exploration vessels are operating at the same time. In some of these areas interference with a vessel's reception of seismic signals from signals generated from other vessels can become sufficiently great so as to require a shutdown of operations. Alternatively, vessel operators must consult together and allocate times and areas of operation, a procedure that can be exceedingly costly. The problem is particularly acute in the case of impulsive sources of high power. Interference will be reduced for swept sources but will still exist if the sweeps employed by those sources are monotonic. Randomized sweeps in accordance with the present invention reduce such interference to a negligible level because all sweeps employed are orthogonal to each other as described hereinabove. Orthogonality assures that the result of correlating one sweep signal replica with another received sweep signal is very small indeed.

In the conduct of three dimensional (3/D) seismic surveys, it is necessary to obtain data along a plurality of closely spaced parallel lines. The present state-of-the-art utilizes data obtained by a single ship emitting repeated signals and towing a single hydrophone cable to traverse the desired survey lines one after another. This procedure is both costly and time consuming. If, on the other hand, ships are equipped to emit orthogonal randomized pulse sweeps, two ships may be used simultaneously to follow parallel tracks while maintaining the same speed and direction so that the two ships are travelling abreast. Each ship operates a sound source in accordance with its own unique randomized sequence which is different from or otherwise maintained orthogonal to the sweeps employed by the other ship. As is well known in seismic surveying, two ships operating thus in parallel will cover three lines of survey, namely the line under the path of each ship and the line midway between the two ships. As a matter of fact, the two ships will be covering the mid line between them redundantly, namely by means of the signal emitted by the first ship and received by the second and the signals emitted by the second ship and received by the first. By using orthogonal sweeps throughout, all data obtained may be sorted by means well known in the geophysical exploration art. After the data are recorded and brought to a computer center the result will be to obtain three survey lines with the two ships, thus saving both time and money. The time savings will be such that the survey can be completed in approximately ½ the time required for a single ship operation, at a cost of ⅔ that of a single ship operation.

Additional benefits will be obtained through the use of orthogonal randomized sweeps relative to conventional impulsive sources by effective immunity to external coherent noise sources from a variety of origins. For example, own ship's noise will tend to be emitted in a combination of single frequencies and will appear in seismic records as noise. The correlation process when swept signals are used will reduce such interference to a relatively insignificant level. The orthogonal randomized sweep is best suited for this purpose because sections of the sweep will not replicate segments of sinusoids as may monotonic sweeps. One common source of extraneous noise of a steady frequency is a drilling oil-well that emits a frequency dependent on the rotation rate of the drill bit. Machinery on a drilling platform will also, in general, emit fixed frequency signals at a variety of frequencies, many of which fall within or alias into the seismic band. In all such cases, the randomized orthogonal sweep will produce the optimum noise cancellation and thereby produce the best seismic results.

While this invention has been described in terms of the pulses taught in the Nelson patent, it will be apparent to those skilled in the art that the principles of this invention may be applied by randomizing any ordered sequence of pulses.

From the foregoing description it will be apparent that there has been provided improved methods and apparatus for the generation of the seismic signals and the processing thereof which produces new and advantageous results in providing information from which seismograms may be constructed. Variations and modifications in the herein described methods and apparatus, within the scope of the invention, will undoubtedly suggest themselves to those skilled in the art. Accordingly, the foregoing description should be taken as illustrative and not in a limiting sense.

I claim:

1. The method of seismic prospecting which comprises the steps of:
   (a) determining a first set of numbers representing each of the signals of different durations comprising a monotonic sweep;
   (b) psuedo-randomizing the sequence of the numbers to generate and transmit a first series of sweeps of said signals, each of said sweeps substantially orthogonal to the others in which the occurrence of said signals of different durations is randomized within each sweep in accordance with the psuedo-randomized sequence of numbers;
   (c) receiving said first series of sweeps of signals after passage thereof through a medium; and
   (d) thereafter processing the signals to produce a seismogram by cross correlating the received signals with replicas of one or more selected subsets of each of the sweeps as transmitted whereby the effective duration and shot point spacing shown by the seismogram may be selected during processing by selection of a desired subset from the first series of sweeps.

2. The invention as set forth in claim 1 wherein said transmitting step includes the step of;
   (e) transmitting a second series of psuedo-randomized sweeps such that signals from different ones of said series of sweeps are received in overlapping time relationship, and such that the cross-correlation of said series of sweeps is minimized.

* * * * *

UNITED STATES PATENT AND TRADEMARK OFFICE
CERTIFICATE OF CORRECTION

PATENT NO. : 4,545,039

DATED : October 1, 1985

INVENTOR(S) : Carl H. Savit

It is certified that error appears in the above-identified patent and that said Letters Patent is hereby corrected as shown below:

Column 3, line 9, correct "other".

In the (GRANT ONLY) Patent No. 4,544,039 bearing columns 1-4 should be deleted to be replaced with Patent No. 4,545,039 bearing columns 1-4 as shown on the attached sheets.

Signed and Sealed this

Twenty-first Day of October, 1986

[SEAL]

*Attest:*

DONALD J. QUIGG

*Attesting Officer*    *Commissioner of Patents and Trademarks*

METHODS FOR SEISMIC EXPLORATION

The present invention relates to methods and apparatus for the transmission of signals useful in seismic exploration both on land and in water covered areas, and also to methods and apparatus for deriving information from the cross correlation of the transmitted signals which are received after reflection from geological interfaces with replicas of the transmitted signals so as to delineate reflecting surfaces at different penetrations into the formation with high resolution.

In the search for high resolution seismograms, various types of signals have been designed for transmission into the ground in the form of acoustic energy. Classically these signals have been sinusoids which sweep in frequency linearly and monotonically with time (see, D. L. Goupillaud, Signal Design in the "Vibroseis" Technique, Geophysics, Vol. 41, No. 6, 1291–1304, December 1976. D. E. Nelson (U.S. Pat. No. 4,204,278, issued May 20, 1980) has described a signal design which can be generated and transmitted for geophysical exploration into the ground utilizing quasi-periodic pulse trains which are swept in repetition frequency over an octave monotonically and combined with the transmission through the medium (viz, after reflection from the geological reflecting surfaces) from which high resolution and accurate seismograms can be generated.

It has been found in accordance with this invention that a signal, with the energy content of Nelson's signal, and containing exactly the same pulses may be randomized (or pseudo randomized) such that its constituent parts (the individual durations or periods which vary in their time length, each constituting a signal making up the sweep or transmission) occur in differently scrambled order in each sweep and in successive sweeps so that no two sweeps in a set of sweeps are substantially correlated thereby to preclude false target indications and information that might erroneously locate or obscure geological reflecting surfaces. A signal provided in accordance with this invention when transmitted into the ground and received by receptors (for example in an array of geophones or hydrophones) possesses important advantages arising out of a lack of correlation between successive lengths (the pluralities of signals) which make up the sweeps or successive sweeps. These advantages include: (a) The ability to derive information from the received signals in which the shot point spacing and common depth point (CDP) multiplicity may be selected as desired after the survey is performed and may vary for different parts of the section; (b) The ability to sum the auto correlation functions (the cross correlation output of each sweep after transmission through the medium with its replica) and provide side lobes adjacent to the main lobe which are of the same order of amplitude as obtained with a monotonic sweep or less; and (c) The generation of side lobes in the correlation functions which are uncorrelated from sweep to sweep in successive seismograms, which with monotonic sweeps would be correlated, thereby further reducing side-lobe amplitude in gummed or stacked traces.

While various pseudo random sequences of sinusoidal waves or pulses have been proposed, neither the randomization of the signals in the transmission to preclude cross correlation both internally in a sweep and between successive sweeps nor the randomization of the signals in a transmission as defined by Nelson, has even been suggested as being possible or practicable (see the article by P. L. Goupillaud referenced above and Crook et al, U.S. Pat. No. 3,264,606, issued Aug. 2, 1966; Forrester, U.S. Pat No. 326,320 issued June 20, 1967; Barbier et al, U.S. Pat. No. 3,811,111 issued May 14, 1974; Barbier, U.S. Pat. No. 3,956,730, issued May 11, 1976; and Barbier, U.S. Pat No. 4,011,924 issued Mar. 15, 1977).

In the randomization proposed by Goupillaud, because the successive pulses after randomization do not join smoothly at pulse boundaries, spurious frequencies are generated and the frequency range of the sweep differs from that of the monotonic sweeps. Thus the amplitude spectrum of two "randomized" sweeps intended to have the same range, will in fact be different. The orthogonality of randomized sweeps as suggested by Goupillaud is governed by pure chance and may in any given instance not be valid.

Accordingly, it is the principal object of the present invention to provide improved methods and apparatus for the transmission of signals suitable for seismic exploration and geophysical prospecting both on land and in water covered areas.

It is another object of the present invention to provide improved methods and apparatus for seismic prospecting in which the seismic signals are transmitted and processed so as to obtain seismograms having selected shot point spacing, sweep duration, and CDP multiplicity from the same transmission and without having to repeat the transmissions.

It is a further object of the present invention to provide improved methods and apparatus for the transmission of seismic signals which enables the sweep duration to be selected either upon transmission or during processing after the survey is performed so as to obtain information in which the necessary compromise between the resolution, penetration and signal to noise ratio yields optimum results.

It is a still further object of this invention to provide a method of generating and applying a set of distinctly different, mutally orthogonal, seismic signals all having the same amplitude spectra.

Briefly described, the invention may for example be used in methods and apparatus for transmitting seismic signals which change in duration by a factor not exceeding two to one (a frequency change not exceeding an octave) during a sweep. The invention improves such signals by generating a predetermined number of them of different duration during the sweep and randomizing the occurrence of these signals of different duration such that none of these signals repeats or are missing during the sweep. The cross correlation of any successive pluralities of the signals within the sweep or in successive sweeps which may be transmitted such that signals from successive sweeps may be received at a receiving location during the same period of time, do not provide significant cross correlation outputs (they are essentially orthoganal). Further, in accordance with the invention, the cross correlation of the signals that are received after transmission through the medium may be carried out with less than all of the signals in the sweep. This enables effectively varying the shot point spacing of the sweeps and, of course, the CDP multiplicity so as to obtain the needed resolution, penetration and signal-to-noise ratio for any section of the seismogram.

The randomized sequences of signals also include sequences which may be deemed pseudo-random in that the order of pulses in each sweep is scrambled in accordance with a predesigned system to improve orthogonality among the sweeps.

By applying the randomization process to pulses such as those disclosed by Nelson, the joints between successive pulses are smooth and do not contribute spurious frequencies to the amplitude spectrum of the resulting sweep signal.

Figure 2:
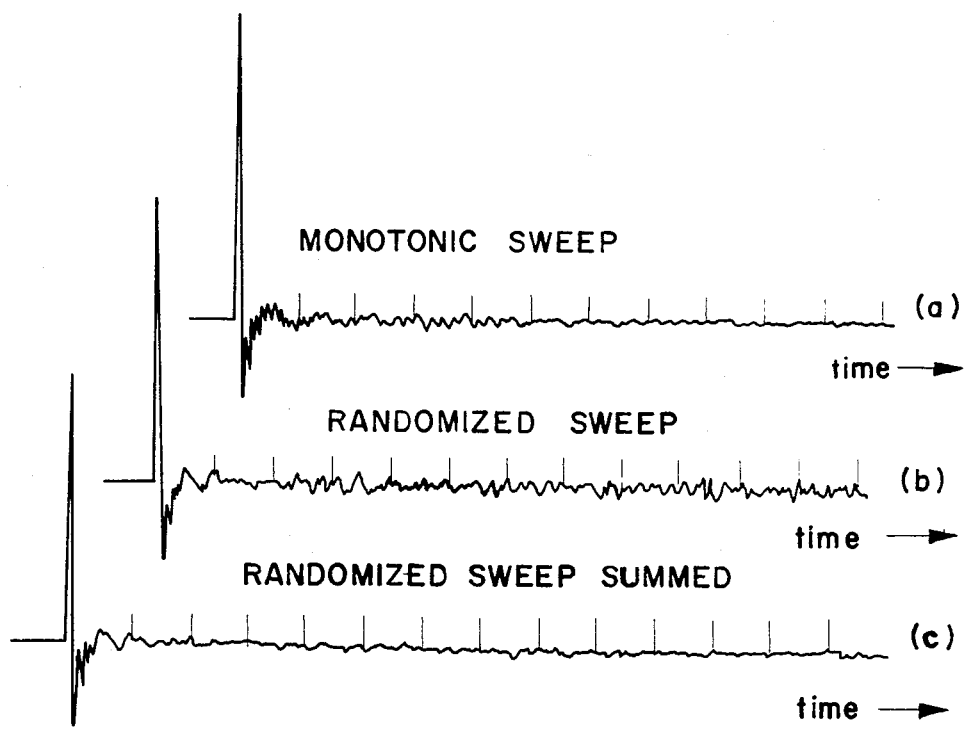

The foregoing and other objects, features and advantages of the invention as well as the preferred embodiment of the invention and the best mode presently known for carrying out the invention will become more apparent from a reading of the following description in connection with the accompanying drawings in which:

FIG. 1 is a block diagram schematically illustrating apparatus embodying the invention and by means of which the invention may be practiced; and FIG. 2 shows auto correlation functions of signals which may be generated and transmitted in accordance with the invention.

Referring more particularly to FIG. 1, there is shown a store 10 of the successive numbers 1 to n in a succession of randomized orders. A suitable store may be read-only memory generally known as a ROM or a PROM. One randomized set of signals corresponding to numbers from 1 to n is known as a sweep. A typical sweep may be ten seconds in time length and have 196 signals. These signals are formed from a plurality of pulse trains S1, S2, S3, S4, S5, and S6. A seismic source or preferably a plurality of seismic sources 12 are driven by these signals, S1 through S6, to provide the transmission of the signals in the form of acoustic signals corresponding thereto. The sources 12 which are used depend on whether the signals are to be transmitted directly into the earth formation on land or into the earth formation via water, as in water covered areas. The nature of the sources 12 and the nature of the signals in each duration or period which constitute unique ones of the 196 signals in this example are described in the above referenced Nelson U.S. Pat. No. 4,204,278. Each signal has a duration which is referred to as a fundamental period in the Nelson patent. The time length of the signals (their periods) vary monotonically in the Nelson patent with the ratio of the duration from the longest to the shortest signal not exceeding a factor of two to one. The repetition frequency of the signals in a sweep, thus does not exceed an octave in frequency range. The same octave frequency range is covered by the signals produced and transmitted with the apparatus shown in FIG. 1. However, different signals (signals which are of different duration and are different ones of the 196 signals) are scrambled or randomized and transmitted in the random order. This randomizing of the signals results in the advantages obtained by the invention.

The numbers stored in store 10 consist of a preselected small number of premutations of the number n of signals of different length selected for a sweep. If the number of different permutations selected is only two, a convenient selection may be made by using any order whatsoever, even a monotonic increasing sequence, and the same order reversed. For example if n=4 the first order may be 1342 and the second 2431. It is readily apparent that no two numbers in the first set are in the same order as those in the second set hence the sweeps generated from the two sets will be uncorrelated at all but a maximum of one signal for all relative displacements of the two sweeps, hence the cross correlation of the two sweeps will be a minimum. Otherwise stated, the two sweeps are orthogonal.

This concept will be better understood by reference to the following schematic table for the above example in which n = 4 (for simplicity correlations have not been divided by a normalizing factor).

$$\left.\begin{array}{l}S_1S_3S_4S_2 \\ S_2S_4S_3S_1\end{array}\right\} \text{Correlation value } S_1S_2 + S_3S_4 + S_2S_3$$

$$\left.\begin{array}{l}S_1S_3S_4S_2 \\ S_2S_4S_3S_1\end{array}\right\} \text{Correlation value } S_3S_2 + S_4^2 + S_2S_3$$

$$\left.\begin{array}{l}S_1S_3S_4S_2 \\ S_2S_4S_3S_1\end{array}\right\} \text{Correlation value } S_4S_2 + S_2S_3$$

$$\left.\begin{array}{l}S_1S_3S_4S_2 \\ S_2S_4S_3S_1\end{array}\right\} \text{Correlation value } S_2^2$$

It will be noted that none of the correlations contains more than one squared value. That condition is referred to herein as orthogonality between the two sweeps.

To generate a set of orthogonal sweeps for any n, the following method may be used.

First, write the numbers from 1 to n in increasing monotonic order. For example if n=10: 1,2,3,4,5,6,7,8,9,10.

Second, write a new set beginning with 2 and successively add 2 to each preceding number. If a number exceeds n, subtract (n+1) from it. In the example: 2,4,6,8,10,1,3,5,7,9. Third, write a new set beginning with 3 and successively add 3 to each preceding number. Again if a number exceeds n, subtract (n+1) from it. In the example: 3,6,9,1,4,7,10,2,5,8. Continue in this fashion until n is the beginning number in the sequence.

If n+1 is a prime number, all of the n generated sequences will be orthogonal to each other. If n+1 is not a prime number the rule must be modified by requiring the addition of 1 when a zero or a previously obtained number is generated. Only some of the sequences generated for n+1 not a prime will form an orthogonal set. Which ones are to be rejected from the set can be determined by examination. For most cases, n−1 sequences will be found to form an orthogonal set.

It will be noted that exemplary number n=196 is such that n+1=197, a prime number. Since in practice the number n can be chosen within substantial limits, either by slightly modifying the desired frequency range or the sweep duration, it is usually convenient to select n such that n+1 is prime, thereby eliminating a somewhat tedious examination of the generated sequences. If a digital computer is available, the examination of the generated set of sweeps becomes a trivial exercise and n may be conveniently selected without regard to the primality of n+1.

All or a selected smaller number of the generated sequences are stored in store 10 to be fed to reciprocal generator 18 as will be described below. It will generally be useful to reject the first and last sequences generated by the above described process since those are monotonic. The side lobes occurring in the autocorrelations of the second and the penultimate sequences will be lower than those in the two monotonic sequences. If n is quite large, say substantially more than about 10, the third and the antepenultimate sequences will have even lower autocorrelation side lobes. If a computer is available, an exhaustive search may be used to further optimize the selected set of sequences to reduce to a mini-